(12) United States Patent
Jeon et al.

(10) Patent No.: US 8,519,961 B2
(45) Date of Patent: Aug. 27, 2013

(54) PORTABLE TERMINAL AND METHOD FOR DISPLAYING TOUCH KEYPAD THEREOF

(75) Inventors: Jin Young Jeon, Seoul (KR); Hui Chul Yang, Seoul (KR); Min Kyung Lee, Seoul (KR); Nho Kyung Hong, Seoul (KR); In Won Jong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 12/174,100

(22) Filed: Jul. 16, 2008

(65) Prior Publication Data

US 2009/0058815 A1 Mar. 5, 2009

(30) Foreign Application Priority Data

Sep. 4, 2007 (KR) .................. 10-2007-0089305

(51) Int. Cl.
*G06F 3/02* (2006.01)
*G09G 5/00* (2006.01)

(52) U.S. Cl.
USPC ........................................ 345/169; 345/173

(58) Field of Classification Search
USPC ................................................ 345/169
See application file for complete search history.

(56) References Cited

U.S. PATENT DOCUMENTS

| 6,297,795 | B1* | 10/2001 | Kato et al. ..................... 345/684 |
| 6,954,356 | B1* | 10/2005 | Lam ......................... 361/679.09 |
| 7,489,301 | B2* | 2/2009 | Chen et al. ..................... 345/168 |
| 8,031,182 | B2* | 10/2011 | Ladouceur et al. ........... 345/173 |
| 2001/0048428 | A1* | 12/2001 | Ukita et al. ..................... 345/169 |
| 2003/0073414 | A1* | 4/2003 | Capps .............................. 455/90 |
| 2004/0140956 | A1 | 7/2004 | Kushler |
| 2004/0204197 | A1* | 10/2004 | Moon ........................ 455/575.1 |
| 2007/0188472 | A1* | 8/2007 | Ghassabian ................... 345/169 |
| 2007/0236460 | A1* | 10/2007 | Young et al. .................. 345/169 |
| 2009/0199092 | A1* | 8/2009 | Ghassabian ................... 715/261 |

FOREIGN PATENT DOCUMENTS

| JP | 2002328771 | 11/2002 |
| KR | 1020070027096 | 3/2007 |

* cited by examiner

*Primary Examiner* — Kwang-Su Yang
(74) *Attorney, Agent, or Firm* — H.C. Park & Associates, PLC

(57) ABSTRACT

A portable terminal and a method for displaying a touch keypad thereof are disclosed. The portable terminal includes a controller to determine whether a display screen is in a portrait mode in response to a text input request, and a touch screen to split a touch keypad into a left-hand keypad and a right-hand keypad and display one of the left-hand keypad and the right-hand keypad above the other, according to the control of the controller, when the display screen is in the portrait mode. The method includes determining whether a display screen is in a portrait mode in response to a text input request, and splitting a touch keypad into a left-hand keypad and a right-hand keypad and displaying one of the left-hand keypad and the right-hand keypad above the other when the display screen is in the portrait mode.

8 Claims, 6 Drawing Sheets

100
PORTABLE TERMINAL AND METHOD FOR DISPLAYING TOUCH KEYPAD THEREOF

CROSS REFERENCE TO RELATED APPLICATION

This application claims priority from and the benefit of Korean Patent Application No. 10-2007-0089305, filed on Sep. 4, 2007, which is hereby incorporated by reference for all purposes as if fully set forth herein.

BACKGROUND OF THE INVENTION

1. Field of the Invention

The present invention relates to a portable terminal and a method for inputting text, and more particularly, to a portable terminal with a touch screen and a method for displaying a touch keypad thereof.

2. Discussion of the Background

In general, portable terminals have a variety of functions so as to provide composite services. Some portable terminals are configured to include input devices, such as a keyboard or a mouse, etc. to perform a variety of functions. However, it may be awkward to carry such input devices. To resolve this problem, portable terminals have been manufactured to include a touch screen instead of a keyboard or a mouse. These conventional portable terminals display a keypad on their touch screens through which text may be input.

However, the keypad may have a preset structure and may be displayed in a fixed format on the touch screen regardless of the position of the portable terminal. When a conventional portable terminal displays a screen that is wider horizontally than it is vertically, the keypad's width may need to be reduced to be displayed, which may make selecting respective keypad keys difficult. That is, a user may frequently touch keys adjacent to a desired key because of the keypad's reduced width.

SUMMARY OF THE INVENTION

The present invention provides a portable terminal with a touch screen and a method for displaying a touch keypad thereof.

Additional features of the invention will be set forth in the description which follows, and in part will be apparent from the description, or may be learned by practice of the invention.

The present invention discloses a method for displaying a touch keypad of a portable terminal including determining whether a display screen is in a portrait mode in response to a text input request, and splitting a touch keypad into a left-hand keypad and a right-hand keypad when the display screen is in the portrait mode and displaying one of the left-hand keypad and a right-hand keypad above the other.

The present invention discloses a portable terminal including a controller to determine whether a display screen is in a portrait mode in response to a text input request, and a touch screen to split a touch keypad into a left-hand keypad and a right-hand keypad and display one of the left-hand keypad and a right-hand keypad above the other, according to the control of the controller, when the display screen is in the portrait mode.

The present invention also discloses a method for displaying a touch keypad of a portable terminal, including determining whether the portable terminal is in a portrait mode or a landscape mode when a text input request occurs, displaying one of a left-hand keypad of a touch keypad and a right-hand keypad of the touch keypad above the other if the portable terminal is in the portrait mode, and displaying the left-hand keypad and the right-hand keypad side by side if the portable terminal is in the landscape mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF EXEMPLARY EMBODIMENTS

Figure 1:
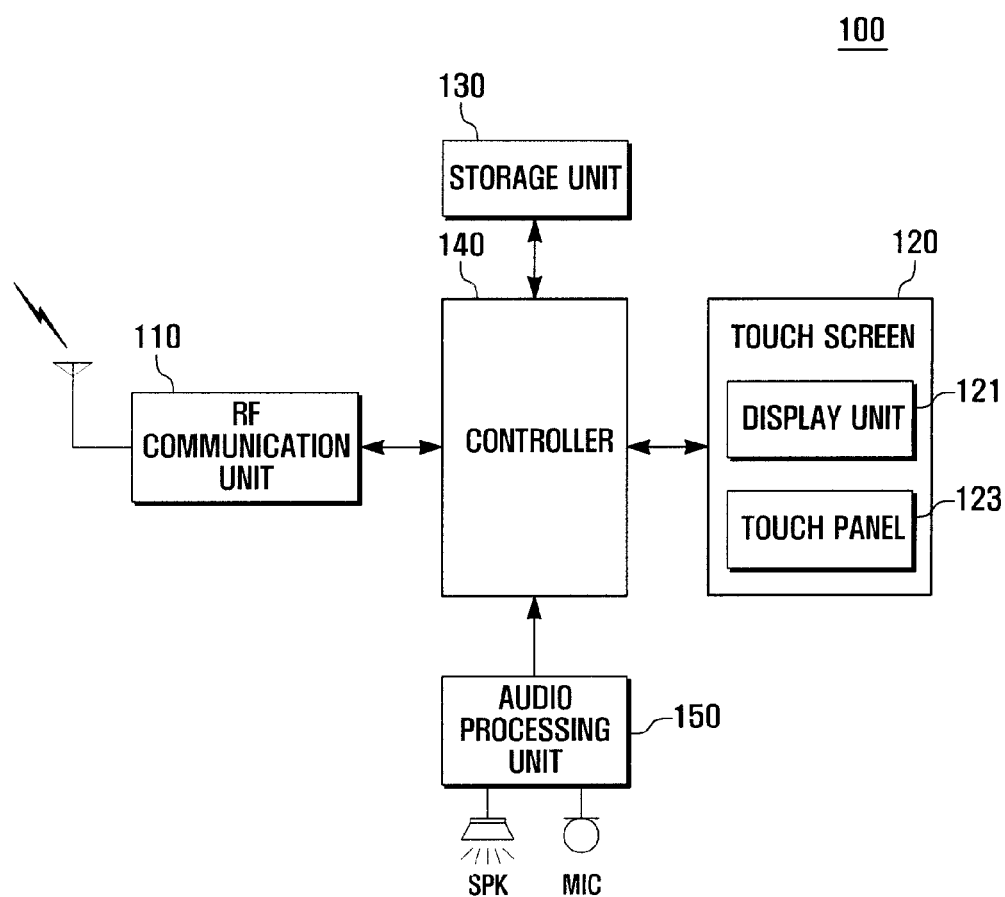
FIG. 1 is a schematic block diagram showing a configuration of a portable terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Prior to explaining the exemplary embodiments of the present invention, terminologies will be defined for the present description below.

The term "portrait mode" refers to a mode in which the long side of the screen of the portable terminal is vertical and the short side is horizontal. The term "landscape mode" refers to a mode in which the long side of the screen of the portable terminal is horizontal and the short side is vertical.

The term "touch keypad" refers to a keypad displayed on a touch screen of the portable terminal. The touch keypad includes a plurality of keys allocated to letters and functions that may be used to input text. That is, the portable terminal displays a touch keypad, so that a user may select the keys on the touch keypad and input text. The touch keypad may be a QWERTY-format keypad having keys that are arranged in a manner similar to those of a keyboard. The touch keypad may be configured to include a left-hand keypad and a right-hand keypad. The left-hand keypad may be configured to include keys that the left-hand mainly uses on the keyboard, and the right-hand keypad may be configured to include keys that the right had mainly uses on the keyboard.

A "touch" occurs when a user contacts the touch screen with his/her finger or a device, such as a stylus. A "drag" occurs when a user moves his/her finger or the device on the touch screen without losing contact with screen. A "drop" occurs when a user lifts his/her finger or the device from the touch screen.

FIG. 1 is a schematic block diagram showing a configuration of a portable terminal according to an exemplary embodiment of the present invention. In the present exemplary embodiment, the portable terminal is a portable telephone.

Referring to FIG. 1, the portable terminal 100 includes an RF communication unit 110, a touch screen 120, a storage unit 130, a controller 140, and an audio processing unit 150.

The RF communication unit 110 performs an RF communication function of the portable terminal 100. The RF communication unit 110 includes an RF transmitter to up-convert the frequency of transmitted signals and amplify the transmitted signals and an RF receiver to low-noise amplify received RF signals and down-convert the frequency of the received RF signals.

The touch screen 120 includes a display unit 121 and a touch panel 123. The display unit 121 displays the state of the portable terminal 100. The display unit 121 may be an LCD. In that case, the display unit 121 includes an LCD controller, a memory to store data, and an LCD device. The touch panel 123 may be mounted to the display unit 121, and includes a touch detecting unit and a signal converting unit. The touch detecting unit detects changes in physical quantities, such as resistance, capacitance, etc., according to a touch. The signal converting unit converts the change in the physical quantity generated according to the touch into a touch signal.

The storage unit 130 is configured to include a program memory and a data memory. The program memory stores an operation program for controlling the operations of the portable terminal 100 and an application program for displaying the touch keypad when text is to be input. The data memory stores data generated while the programs are performed.

The controller 140 controls the overall operation of the portable terminal 100. The controller 140 includes a data processor that includes a transmitter to code and modulate a signal to be transmitted and a receiver to demodulate and decode a received signal. The data processor includes a modem and a codec. The controller 140 receives a touch signal from a signal converting unit and detects touching, dragging, and dropping on the touch panel 123.

The controller 140 displays a touch keypad to allow a user to prepare a text. The controller 140 may split the keypad into the left-hand keypad and the right-hand keypad, and displays one above the other in a portrait mode. Also, the controller 140 can switch the positions of the left-hand keypad and the right-hand keypad according to a switch request. In addition, the controller 140 may join the left-hand keypad and the right-hand of the touch keypad, side by side, in a landscape mode. The controller 140 splits the touch keypad or joins the split touch keypads together, according to whether the portable terminal is in a portrait mode or a landscape mode.

The audio processing unit 150 reproduces the audio signals output from the codec of the data processor and outputs them to the speaker SPK. Also, the audio processing unit 150 transmits the audio signals input through a microphone MIC to the audio codec of the data processing unit.

Figure 2:
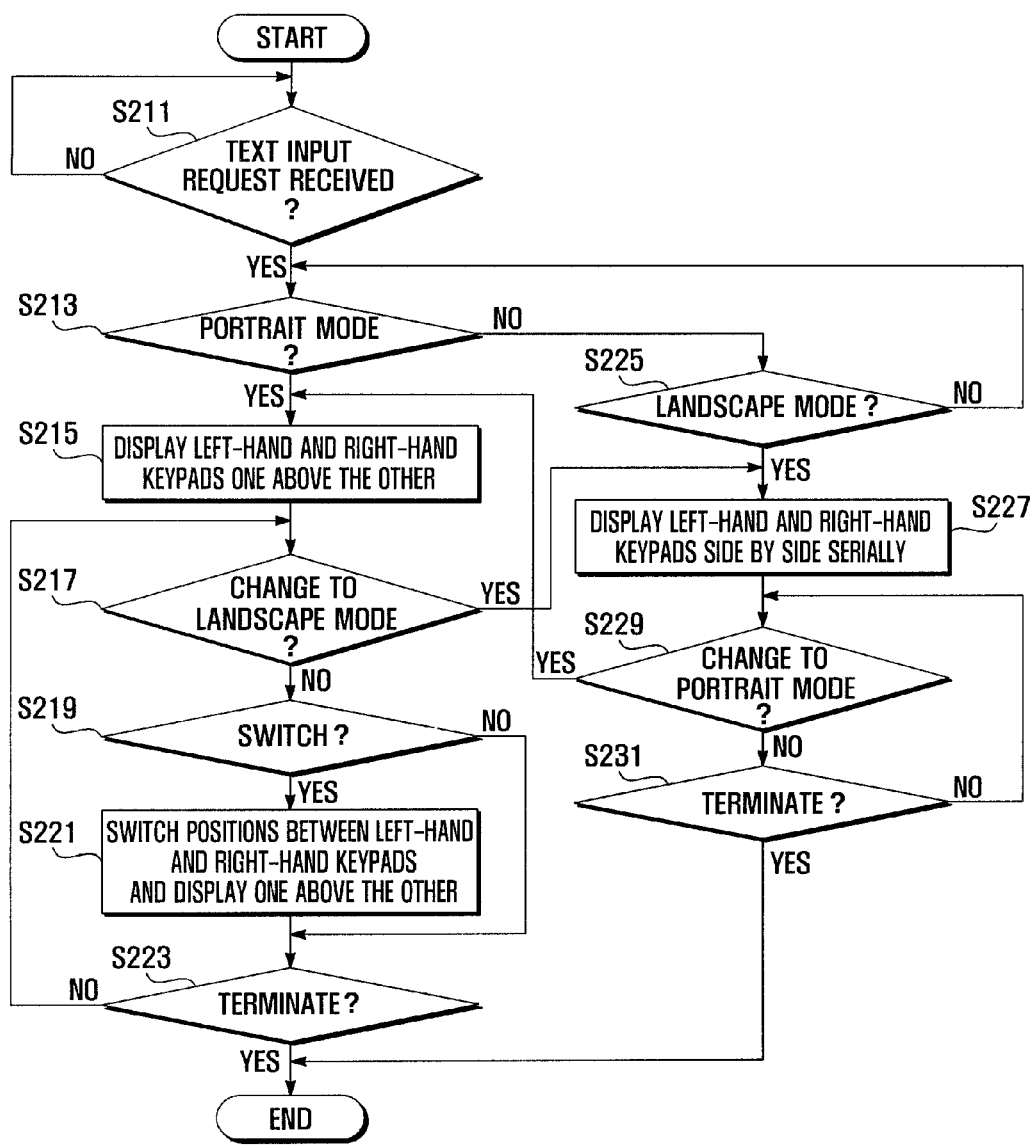
FIG. 2 is a flow chart describing a method for displaying a touch keypad according to an exemplary embodiment of the present invention.

FIG. 2 is a flow chart describing a method for displaying a touch keypad according to an exemplary embodiment of the present invention. FIG. 3A, FIG. 3B, FIG. 3C, FIG. 3D, FIG. 3E, FIG. 3F, and FIG. 3G show screens displayed while the method for displaying a touch keypad is performed, according to an exemplary embodiment of the present invention. FIG. 3A, FIG. 3B, FIG. 3C, FIG. 3D, and FIG. 3E show screens of a touch keypad in a portrait mode, and FIG. 3F and FIG. 3G show screens of a touch keypad in a landscape mode. The touch keypad shows keys of uppercase English letters, however, the touch key pad may be arranged to include other keys such as English lowercase letters or Hangeul letters.

As shown in FIG. 2, in order to display a touch keypad on the screen, the controller 140 detects a text input request (S211). When the controller 140 detects a text input request at S211, it then determines whether the text is to be prepared while in a portrait mode (S213). That is, the controller 140 determines whether the screen 300 is displayed such that the long side of the screen is vertical on the touch screen 120, as shown in FIG. 3A.

Figure 3A:
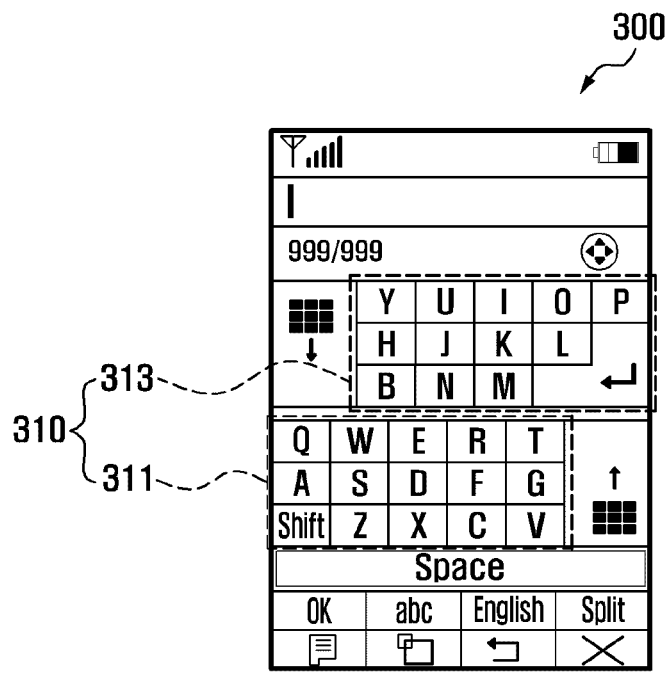
FIG. 3A, FIG. 3B, FIG. 3C, FIG. 3D, FIG. 3E, FIG. 3F, and FIG. 3G show screens displayed while the method for displaying a touch keypad is performed, according to an exemplary embodiment of the present invention.

When the controller 140 determines that the text input request corresponds to a portrait mode at S213, it displays a touch keypad 310 as shown in FIG. 3A (S215). That is, the controller 140 splits the touch keypad 310 into the left-hand keypad 311 and the right-hand keypad 313 and then displays one above the other on the touch screen. That is, the controller 140 displays the left-hand and right-hand keypads 311 and 313 in such a way that the right-hand keypad 313 is arranged above the left-hand keypad 311 or vice versa. After that, the controller 140 can detect a touch generated through the touch keypad 310, and allow text input according to corresponding touched keys to be displayed and functions corresponding to touched keys to be executed.

Figure 3B:
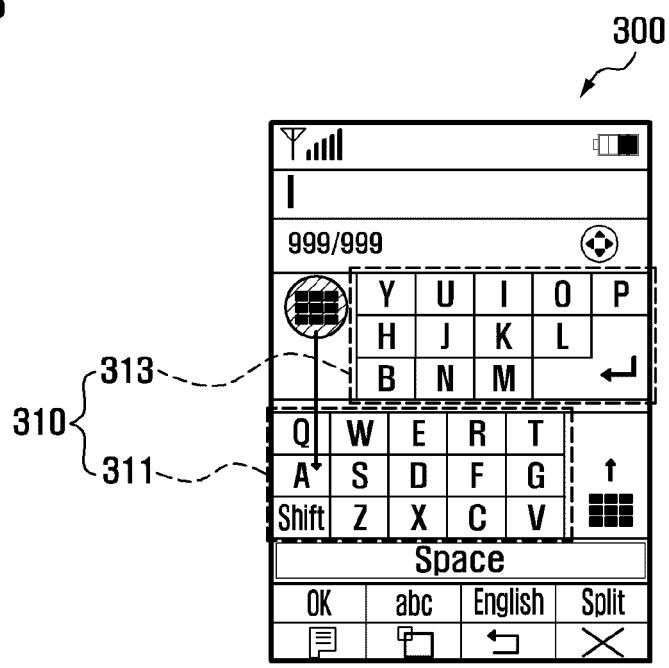
Figure 3C:
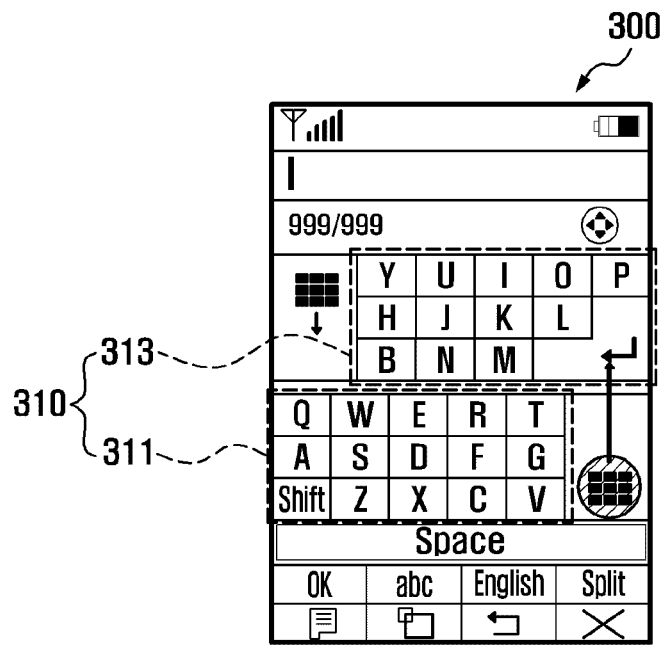
Figure 3D:
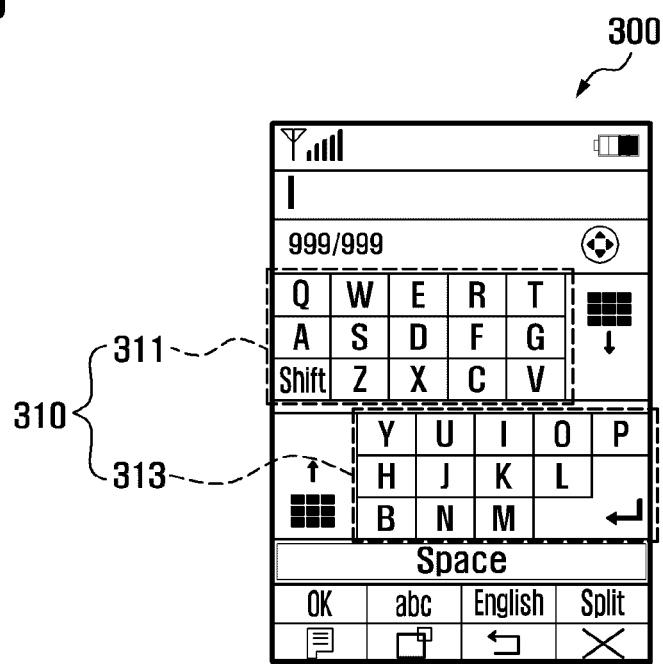

After displaying the left-hand and right-hand keypads 311 and 313 on the touch screen at S215, the controller 140 determines whether a request to change a portrait mode to a landscape mode is detected (S217). When the controller 140 does not detect a request to change a portrait mode to a landscape mode at S217, it further determines whether a switch request occurs as shown in FIG. 3B or FIG. 3C (S219). When a switch request has occurred at S219, the controller 140 changes the positions between the left-hand keypad 311 and the right-hand keypad 313 as shown in FIG. 3D (S221). Here, a touch or a drag-and-drop in the margin at the periphery of the left-hand keypad 311 or right-hand keypad 313 is a switch request. A touch generated through a particular key allocated to a switch function may also be a switch request. When the controller 140 detects a switch request, it switches the positions of the left-hand keypad 311 and the right-hand keypad 313 (S221). After that, the controller 140 can detect a touch generated through the touch keypad 310, and allow text input according to corresponding touched keys to be displayed and functions corresponding to touched keys to be executed.

Afterwards, the controller 140 detects whether a request to terminate a touch keypad displaying procedure occurs (S223). When the termination request does occur at S223, the controller 140 stops displaying the touch keypad. To the contrary, when no termination request occurs at S223, the controller 140 proceeds with step S217.

If the controller 140 determines that the text input request does not correspond to a portrait mode at S213, it further determines whether the request corresponds to a landscape mode (S225). Alternatively, the controller 140 may first determine whether the text input request corresponds to a landscape mode, and if not, then may determine whether the text input request corresponds to a portrait mode. That is, the controller 140 determines whether the screen 300 is displayed such that the long side of the screen is horizontal on the touch screen 120.

When the controller 140 determines that the request corresponds to a landscape mode at S225, it displays a touch keypad 310 (S227), as shown in FIG. 3F. That is, the controller 140 joins and displays the left-hand keypad 311 and right-hand keypad 313 side by side. The left-hand and right-hand keypads 311 and 313 are joined together to form a touch keypad 310 having a QWERTY key format. After that, the controller 140 can detect a touch generated through the touch keypad 310, and allow text input according to corresponding touched keys to be displayed and functions corresponding to touched keys to be executed.

After displaying the joined left-hand keypad 311 and right-hand keypad 313 on the touch screen at S227, the controller 140 determines whether a request to change a landscape mode to a portrait mode is detected (S229). When the controller 140 does not detect a request to change a landscape mode to a portrait mode, it further determines whether a request to terminate a touch keypad displaying procedure occurs (S231). When a termination request does occur at S231, the controller 140 ends the touch keypad displaying procedure. To the contrary, when a termination request does not occur at S231, the controller 140 proceeds with step S229.

When the controller 140 detects a request to change a landscape mode to a portrait mode (S229), as shown in FIG. 3G, it proceeds with S215 where a touch keypad 310 is displayed, as shown in FIG. 3A. That is, the controller 140 splits the touch keypad 310 into the left-hand keypad 311 and the right-hand keypad 313 and then displays one above the other on the touch screen.

Figure 3E:
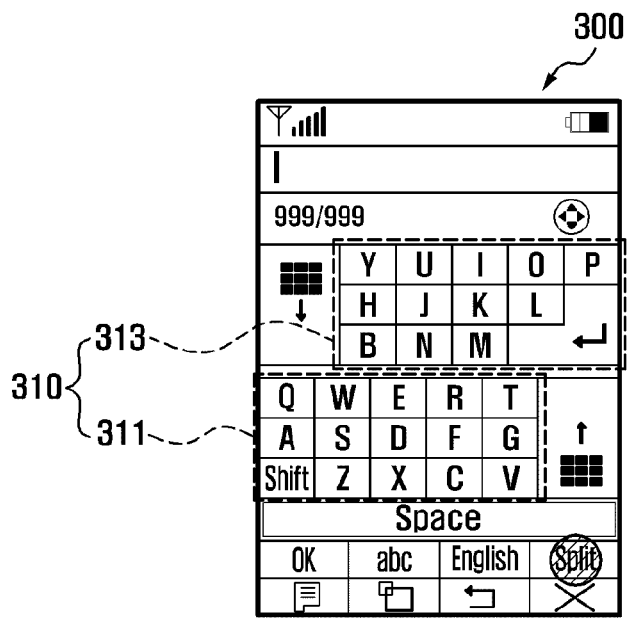
Figure 3F:
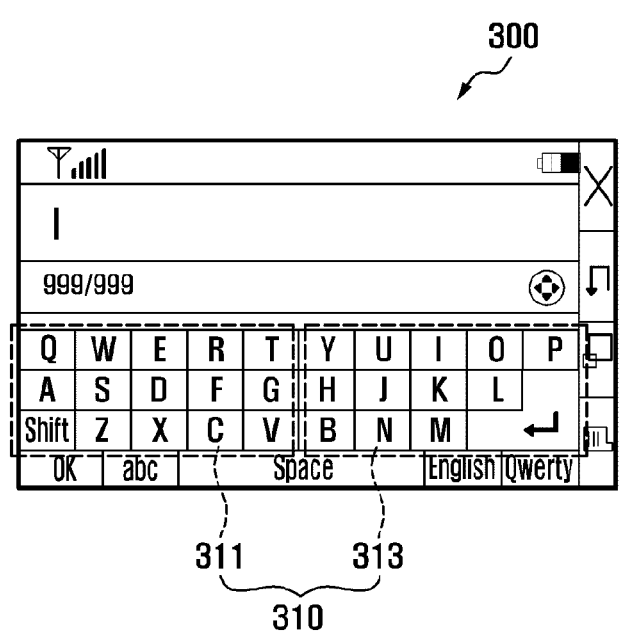
Figure 3G:
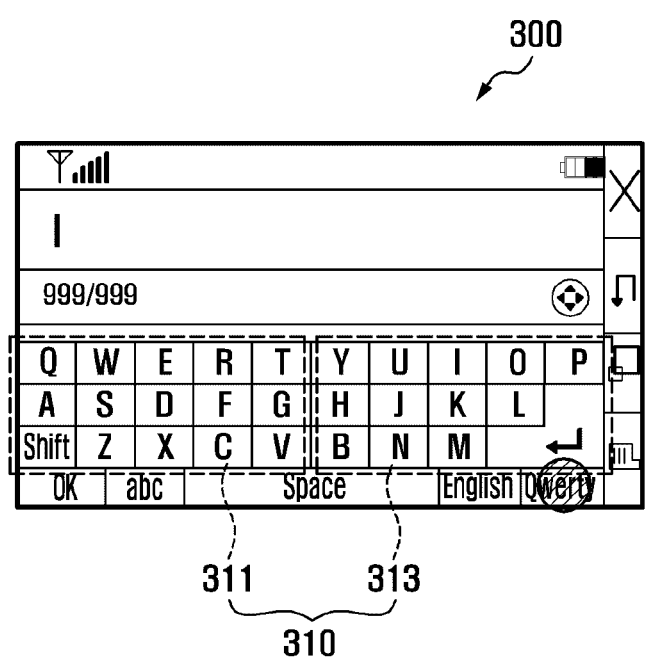

When the controller 140 detects a request to change from a portrait mode to a landscape mode (S217), as shown in FIG. 3E, it displays a touch keypad 310 (S227), as shown in FIG. 3F. That is, the controller 140 joins and displays the left-hand keypad 311 and right-hand keypad 313 side by side.

The controller 140 may further detect a switch request to switch the positions of the left-hand keypad 311 and the right-hand keypad 313. If such a switch request is received, the right-hand keypad 313 is displayed on the left and the left-hand keypad 311 is displayed on the right.

In the exemplary embodiment of the present invention, the touch keypad is displayed on the touch screen in a QWERTY key format to allow texts to be input, it should be understood that the present invention is not restricted by this exemplary embodiment. That is, when a touch keypad changes in size according to the landscape mode or portrait mode of the portable terminal, it may be adapted to the present invention. For example, the touch keypad according to exemplary embodiments of the present invention may be applied to keypads with keys arranged in a DVORAK format or an AZERTY format, or to keypads with keys arranged similar to those formats. Also, the touch keypad according to exemplary embodiments of the present invention may further be applied to keypads with keys arranged in any other keyboard format.

As described in the foregoing, the portable terminal and the method for displaying a touch keypad thereof, according to exemplary embodiments of the present invention, splits the touch keypads into the left-hand keypad and the right-hand keypad and displays one above the other in the portrait mode of the portable terminal, which does not require a reduction in width of the touch keypad. Therefore, a user may easily select the respective keys on the touch keypad of the portable terminal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for displaying a touch keypad on a touch screen of a portable terminal, comprising:

determining whether the touch screen is in a portrait mode in response to a user input;

splitting the touch keypad displayed on the touch screen into a left-hand keypad and a right-hand keypad when the touch screen is in the portrait mode and displaying, on the touch screen, one of the left-hand keypad and the right-hand keypad above the other; and joining the left-hand keypad and the right-hand keypad when the portrait mode is changed to a landscape mode and displaying, on the touch screen, the left-hand keypad and the right-hand keypad side by side with each other, wherein said splitting the touch keypad into the left-hand keypad and the right-hand keypad and said displaying, on the touch screen, one of the left-hand keypad and the right-hand keypad above the other is performed when the landscape mode is changed to the portrait mode.

2. The method of claim 1, further comprising:

switching positions of the left-hand keypad and the right-hand keypad with each other in response to a switch request.

3. The method of claim 1, further comprising:

determining whether the touch screen is in the landscape mode when the touch screen is not in the portrait mode; and joining the left-hand keypad and the right-hand keypad when the touch screen is in the landscape mode and displaying, on the touch screen, the left-hand keypad and the right-hand keypad side by side with each other.

4. The method of claim 1, wherein the touch keypad comprises a QWERTY format keypad.

5. A portable terminal, comprising:

a controller for determining whether a touch screen is in a portrait mode in response to a user input, and splitting a touch keypad displayed on the touch screen into a left-hand keypad and a right-hand keypad when the touch screen is in the portrait mode; and a touch screen for displaying one of the left-hand keypad and the right-hand keypad above the other, according to the control of the controller, wherein the controller controls to join the left-hand keypad and the right-hand keypad when the portrait mode is changed to a landscape mode and display, on the touch screen, the left-hand keypad and the right-hand keypad side by side with each other, and wherein the controller splits the touch keypad displayed on the touch screen into the left-hand keypad and the right-hand keypad and displays one of the left-hand keypad and the right-hand keypad above the other when the landscape mode is changed to the portrait mode.

6. The portable terminal of claim 5, wherein the controller switches positions between the left-hand keypad and the right-hand keypad with each other in response to a switch request.

7. The portable terminal of claim 6, wherein the controller determines whether the touch screen is in the landscape mode when the touch screen is not in the portrait mode, and controls to join the left-hand keypad and the right-hand keypad when the touch screen is in the landscape mode and to display, on the touch screen, the left-hand keypad and the right-hand keypad side by side with each other.

8. The portable terminal of claim 7, wherein the touch keypad comprises a QWERTY format keypad.

* * * * *